United States Patent [19]

Murakami

[11] Patent Number: 4,799,113
[45] Date of Patent: Jan. 17, 1989

[54] APPARATUS FOR PROCESSING DIGITAL DATA

[75] Inventor: Yoshihiro Murakami, Kanagawa, Japan

[73] Assignee: Sony Corp., Tokyo, Japan

[21] Appl. No.: 92,542

[22] Filed: Sep. 3, 1987

[30] Foreign Application Priority Data

Sep. 5, 1986 [JP] Japan .................. 61-209143

[51] Int. Cl.⁴ .................................................. G11B 5/09
[52] U.S. Cl. .................................... 360/32; 371/38
[58] Field of Search .................. 371/38; 360/32, 36.2

[56] References Cited

U.S. PATENT DOCUMENTS 4,742,519 5/1988 Abe et al. .................... 371/38

FOREIGN PATENT DOCUMENTS 1446995 8/1976 United Kingdom .

Primary Examiner—Vincent P. Canney
Attorney, Agent, or Firm—Alvin Sinderbrand

[57] ABSTRACT

An apparatus for processing digital data, for example, as reproduced by a digital video tape recorder, includes a first memory in which words or blocks of reproduced digital data are written in accordance with respective write addresses and from which the words of written data are read out in response to read addresses selected for de-shuffling or de-interleaving of the reproduced data, and a second memory storing, at addresses corresponding to the write addresses at which the words of digital data are written in the first memory, data, such as error flags, indicating the state of such words of digital data. When the words of digital data are read out of the first memory, the data indicating the states thereof are read out from corresponding addresses of the second memory and, in response to the condition thereof, for example, an indication that the associated words of reproduced digital data has been read out of the first memory a predetermined multiple number of times, there is substituted for such word a predetermined pattern of digital data. As a result, in a shuttle mode of the digital video tape recorder, that is, in a reproducing operation with a variable type speed, the display of a moving image is considerably improved.

10 Claims, 3 Drawing Sheets

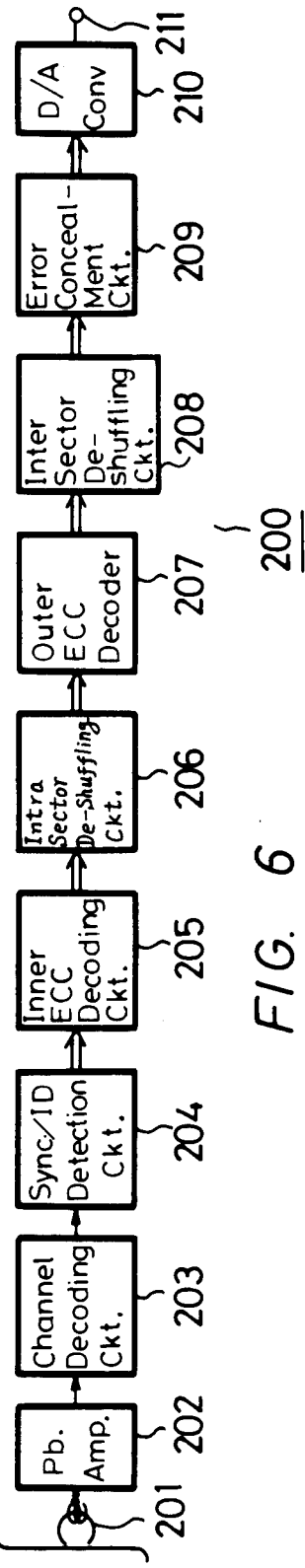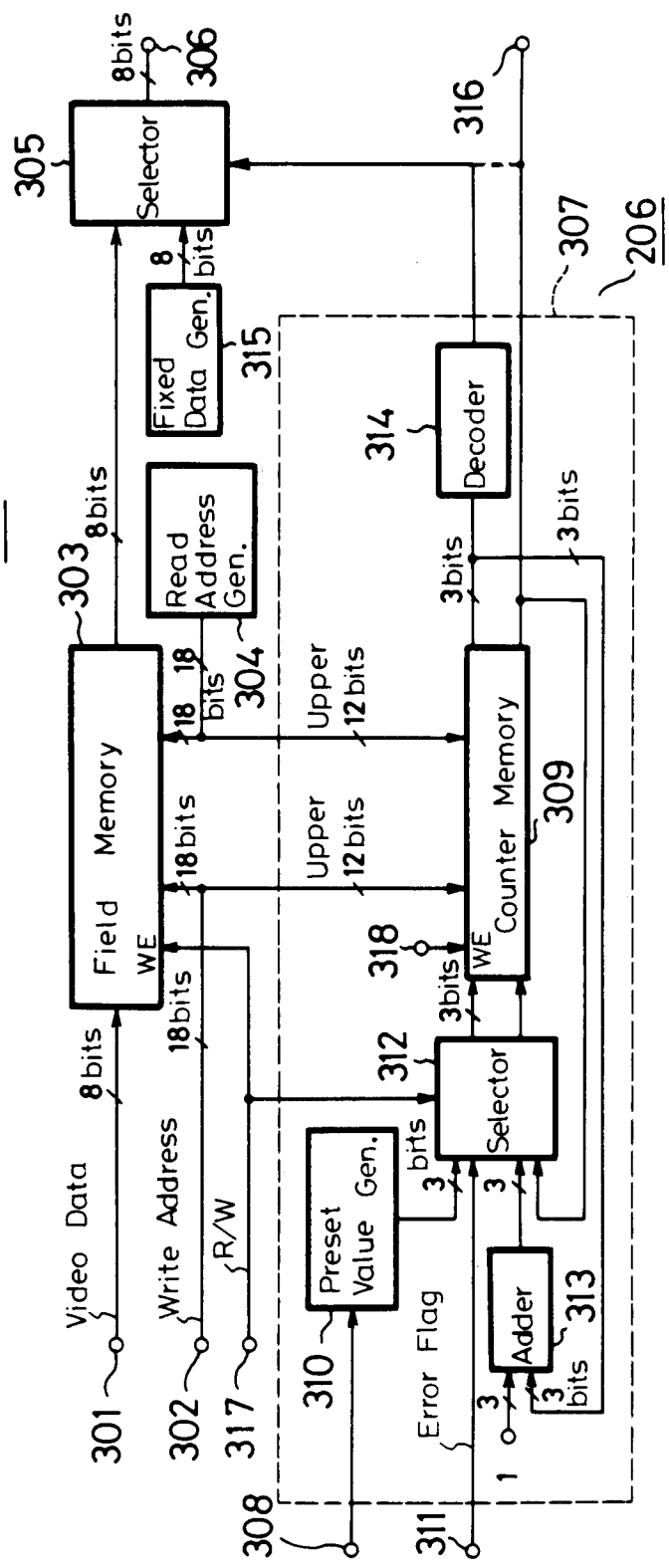

APPARATUS FOR PROCESSING DIGITAL DATA

BACKGROUND OF THE INVENTION

1. Field of the Invention

This invention relates generally to apparatus for processing digital data and, more particularly, is directed to an apparatus for processing digital data obtained from a digital video tape recorder performing a reproducing or playback operation in a shuttle mode, that is, with a variable tape speed.

2. Description of the Prior Art

When a video signal is reproduced at a variable tape speed by a digital video tape recorder (VTR) which reproduces the data of one field by scanning a plurality of oblique tracks, a large time base displacement or error occurs between a reproducing reference signal and the actual reproduced video signal, and such time base error must be corrected.

Therefore, in the prior art, words or blocks of data and the respective addresses are extracted from the reproduced data and the words or blocks of extracted data are then written in a memory at addresses therein corresponding to the respective extracted addresses. Then, the written data is read out from the memory in accordance with read addresses generated in response to a reference signal. The data thus read out from the memory are subjected to a suitable signal processing, such as, error detection and correction in a corresponding circuit, and then transmitted. An example of a digital VTR capable of playback at a variable tape speed is disclosed in Japanese laid open Patent Application Nos. 56-144682 and 60-40573.

In the prior art digital data processing apparatus referred to above, any data once written at a particular address in the memory is held thereat until new data is written at such address in the memory. Accordingly, if data is written in the memory for an address of the field which is not reproduced for a relatively long period of time, for example, as when a reproducing operation is being effected with a tape speed that is twice the normal tape speed, such data is retained in the memory and eventually has no correlation with other portions of the picture or image represented by the data in the memory. In such case, when the data in the memory are read out therefrom in the order of the read addresses generated in response to the reference signal, the resulting picture or image becomes unclear or erroneous in that a residual image appears therein, and the motion of the displayed picture is unnatural or lacking in smoothness.

OBJECTS AND SUMMARY OF THE INVENTION

Accordingly, it is an object of this invention to provide an improved apparatus for processing digital data, and which can avoid the above described disadvantages of the prior art.

More specifically, it is an object of this invention to provide an apparatus for processing digital data, for example, as reproduced by a digital video tape recorder, and which can avoid the inclusion i the processed data of picture elements having no correlation with other elements of the picture displayed in response to playback at a variable tape speed.

It is a further object of this invention to provide an apparatus for processing digital data, as aforesaid, which can improve the follow-up property when a moving picture is displayed in response to the digital data reproduced with a variable tape speed, so that the appearance of residual images can be reduced or avoided.

According to an aspect of the present invention, an apparatus for processing digital data comprises an input circuit for receiving an input digital signal including word data and write addresses associated with respective words of such data, a memory for storing the words of data according to the respective write addresses, a read address generator for generating read addresses by which the stored words are read out from the respective addresses of the memory, for example, to affect de-shuffling thereof, an output circuit for deriving an output signal, a word data generator for generating word data having a predetermined pattern, switching means connected to the memory, the output circuit and the word data generating means for selectively providing, as the output signal, the stored words which are read out from the memory or the word data having a predetermined pattern, and control means supplied with the previously mentioned write and read addresses and being operative to control the switching means for providing the output circuit with the word data having a predetermined pattern as the output signal instead of the stored words read out of the memory whenever the same stored word has been read out of the memory a predetermined multiple number of times.

In accordance with a feature of this invention, the control means for selecting, as the output signal, the word data having a predetermined pattern is operative only when a reproducing operation is being effected in an abnormal mode, for example, in a shuttle mode.

Further, in accordance with another feature of this invention, the control means for selecting the word data having a predetermined pattern as the output signal includes a second memory having addresses corresponding to the addresses in the first mentioned memory and in which flag bits associated with the words of data are written and rewritten in response to the write and read addresses, respectively, for the first memory, with the second memory further storing an indication of the number of times the flag bits are rewritten at the respective addresses thereof.

According to another aspect of the present invention, an apparatus for processing digital data comprises an input circuit for receiving an input digital signal including word data and write addresses associated with respective words of such data, a memory for storing the words of data according to the respective write addresses, a read address generator for generating read addresses by which the stored words are read out from the respective addresses of the memory, for example, to effect de-shuffling thereof, an output circuit for deriving an output signal, and control means supplied with the respective write and read addresses for providing an error flag to a subsequent processing stage, for example, in which error concealment is effected, when the same stored word has been read out of the memory a predetermined multiple number of times.

The above, and other objects, features and advantages of the invention, will be apparent in the following detailed description of preferred embodiments, particularly when the same is read in conjunction with the accompanying drawings in which the same reference numerals are employed to identify corresponding elements and parts.

BRIEF DESCRIPTION OF THE DRAWINGS

FIG. 5 is a block diagram showing a reproducing system of the digital video tape recorder to which the present invention is desirably applied; and FIG. 6 is a block diagram showing a digital data processor in the form of an intra sector de-shuffling circuit included in the reproducing system of FIG. 5 in accordance with an embodiment of the present invention.

DETAILED DESCRIPTION OF THE PREFERRED EMBODIMENTS

An apparatus for processing digital data according to the present invention will be hereinafter described as applied to a video reproducing system of a so-called digital video tape recorder which is hereinafter simply referred to as a digital VTR. Circuits for processing audio and other signals in the digital VTR are not described herein for the sake of simplicity as they are not directly related to the present invention.

Figure 1:
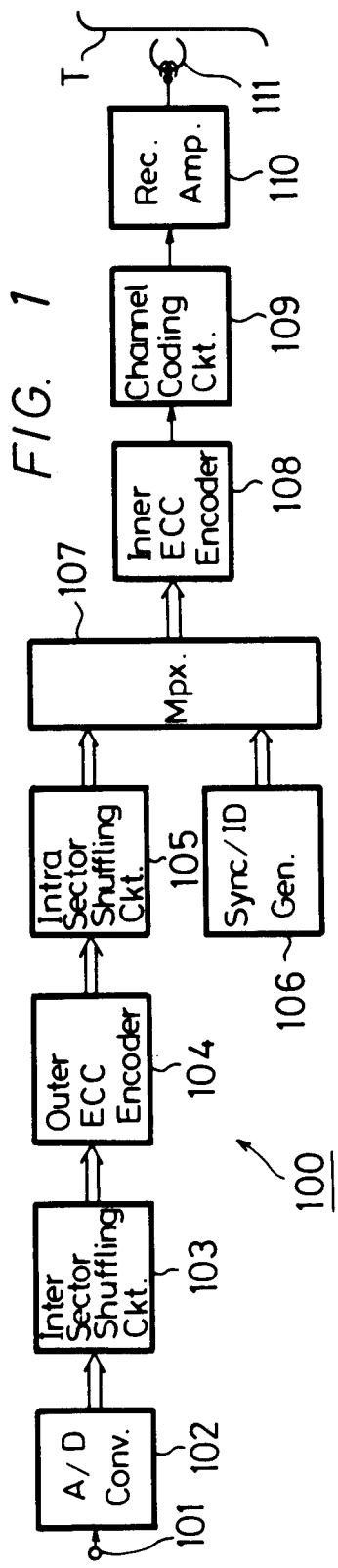
FIG. 1 is a block diagram showing the recording system of a digital video tape recorder of a type to which the present invention is desirably applied.

Referring in detail to FIG. 1, it will be seen that a video recording system 100 of a digital VTR to which the present invention is applied includes a video signal input terminal 101 which receives a composite video signal having 255 lines in each field. Such composite video signal is supplied from terminal 101 to an analog-to-digital (A/D) converter 102 in which it is converted, for example, into 8-bit samples at a predetermined sampling frequency. In the case of a television signal according to the NTSC system, the sampling frequency is selected to provide 768 samples for each line.

Figure 2:
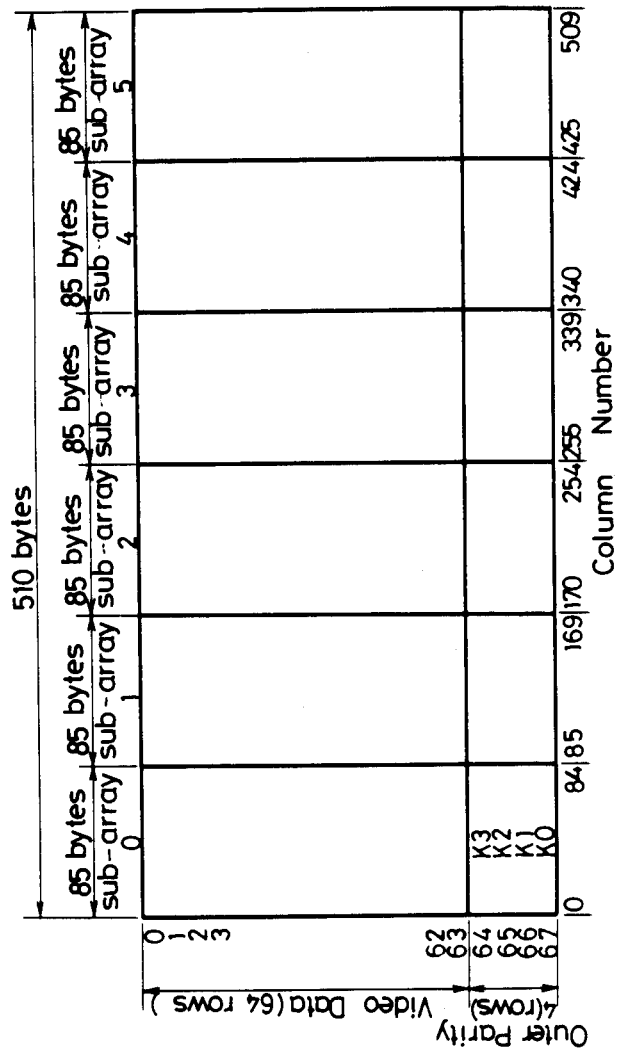
FIG. 2 is a diagrammatic view showing the arrangement of an outer code in an error correction encoder included in the recording system of FIG. 1.

The digitized data from converter 102 is supplied to an inter sector shuffling circuit 103 in which the sampled data for each field is sequentially divided into three segments in the vertical direction of the field with the result that each segment contains the data for 85 lines, or 65,280 samples. Further, in circuit 103, the data of each segment are scattered over two sectors so as to be arranged in matrix form of 64×510 samples in each sector. The data or 32,640 samples in each of the sectors thus shuffled are supplied to an outer error correction code encoder 104 in which the data in each sector are encoded into data with 4 parity words at every outer code block, as shown in FIG. 2.

The thus arranged outer-coded data are shuffled by an intra sector shuffling circuit 105 and then supplied to a multiplexer 107 for the addition thereto, in a time-sharing manner, of a synchronizing (Sync.) signal and an identifying (ID) signal supplied by a synchronizing and identifying signal generating circuit 106. The resulting multiplexed signal is supplied to an inner error correction code encoder 108 for encoding into synchronizing (Sync.) blocks of which one is shown on FIG. 3.

Figure 3:
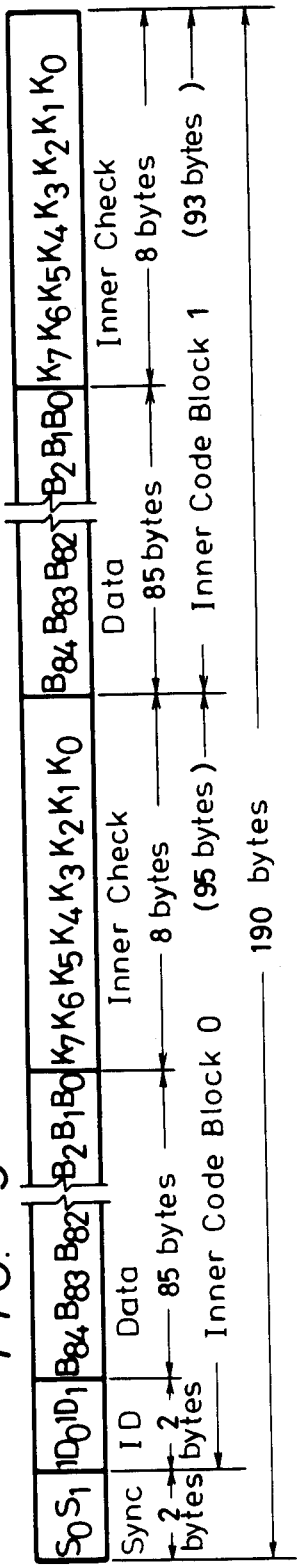
FIG. 3 is diagrammatic view showing an arrangement of an inner code of an error correction encoder also included in the recording system of FIG. 1.

More particularly, as shown on FIG. 3, each of the Sync. blocks consists of 2 bytes of synchronizing data $S_0$, $S_1$, a first inner code block formed of 85 bytes of data $B_0$ to $B_{84}$ added to 2 bytes of ID data $ID_0$, $ID_1$ and 8 bytes of inner parity check data $K_0$ to $K_7$, and a second inner code block formed of 85 bytes of data $B_0$ to $B_{84}$ to which 8 bytes of inner parity check data $K_0$ to $K_7$ are added. 204 Sync. blocks of the type illustrated by FIG. 3 constitute each video sector.

Figure 4:
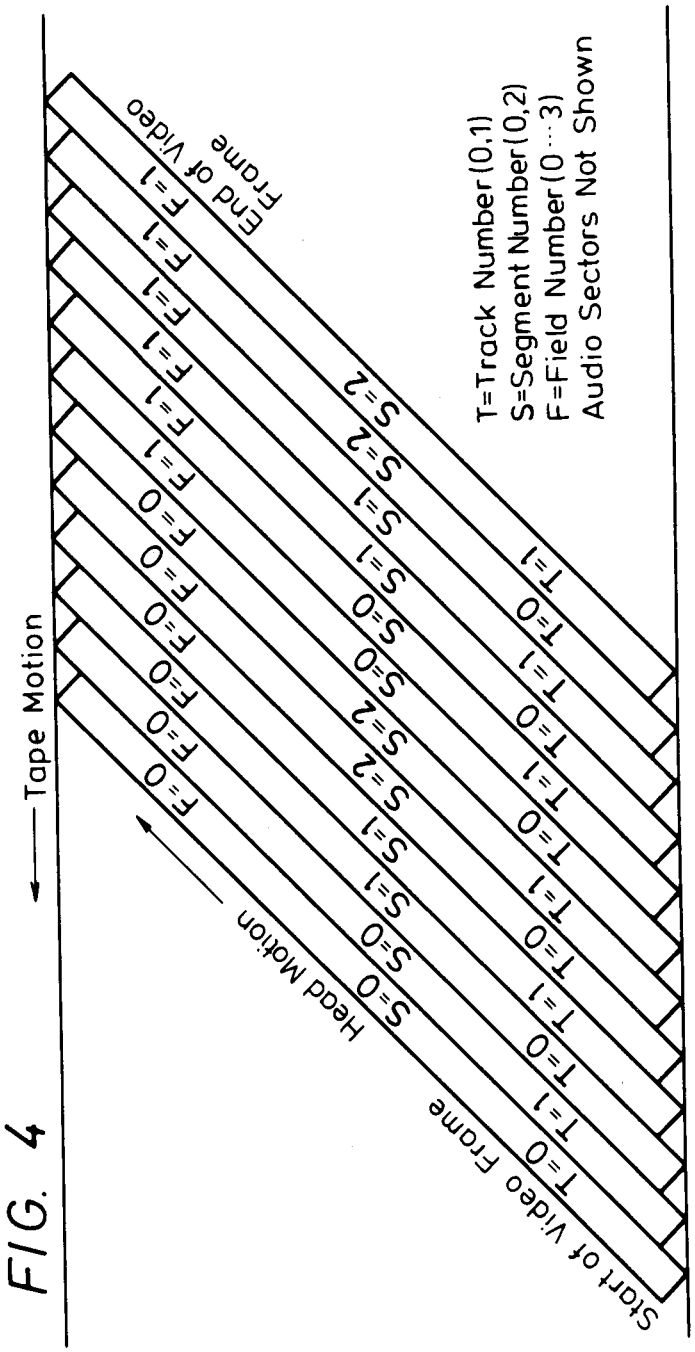
FIG. 4 is a diagrammatic view showing a pattern of tracks in which a video signal is digitally recorded by the recording system of FIG. 1.

The thus arranged data is subjected to a code modulation, such as, that of a Modified Miller Code ($M^2$ Code), by a channel coding circuit 109, and then supplied through a recording amplifier 110 for recording on a tape T, as shown in FIG. 4, by a plurality of recording heads 111 mounted on a rotary head drum (not shown). In the format shown in FIG. 4, the data of one frame of the video signal are recorded in 12 tracks, with one video sector of 204 Sync. blocks being recorded in each track. Accordingly, the ID signal for each Sync. block having the format shown in FIG. 3 indicates the respective Sync. block number and sector ID.

Referring now to FIG. 5, it will be seen that, in a reproducing system 200 of the digital VTR to which the present invention is desirably applied, data are reproduced from the tape T by a reproducing head 201 and supplied therefrom through a playback amplifier 202 to a channel decoding circuit 203, in which the signal recorded according to the Modified Miller Code is converted to a signal of an NRZ (nonreturn to zero) modulation system and then fed to a Sync. signal/ID signal detecting circuit 204. By means of the circuit 204, the Sync. signal is detected for determining the Sync. block to which the data belongs and, at the same time, the ID signal is detected for determining the following signal processing to which each sample of the data is to be subjected. More particularly, since the detected ID signal contains the sector ID and the Sync. block number in such identified sector, if the sequential order of the samples within one Sync. block is considered, it is possible to determine the absolute addresses of the respective samples in the Sync. block. Therefore, the Sync. signal/ID signal detecting circuit 204 is effective to extract the video data as well as the respective addresses thereof.

The data supplied from the detection circuit 204 is applied to an inner error correction code decoding circuit 205 in which it is subjected to error detection and correction processing by using the inner code parity, and any error in the respective ID signal is also detected. If an error in the data constituting the ID signal cannot be corrected, the address of data in the corresponding Sync. block is not reliable, so that data of that Sync. block is not transferred to the next stage constituting an intra sector de-shuffling circuit 206. On the other hand, if the ID signal is correct but the error in the video data is not corrected, an error flag is added to the video data and transferred therewith to the next stage or circuit 206.

More specifically, the data subjected to the error correction process in the inner error correction code decoding circuit 205 and the addresses of such data are supplied to the intra sector de-shuffling circuit 206 in which the data is de-shuffled to the data arrangement of the outer code and then supplied to an outer error correction code decoding circuit 207. In such decoding circuit 207, error correction processing is carried out with reference to the error flags added by the inner error correction code decoding circuit 205. Here again, if the error is not corrected fully in circuit 207, an error flag is added to the data and supplied therewith to an inter sector de-shuffling circuit 208 in which the original data arrangement is restored. Thereafter, any uncorrected error in the data identified by the error flag added thereto is concealed or interpolated by a known concealing or interpolating technique in an error concealment circuit 209. Finally, the error-concealed or interpolated data is converted into an analog video signal by a digital-to-analog (D/A) converter 210 and then delivered therefrom through a video signal output terminal 211.

Referring now to FIG. 6, it will be seen that, in the intra sector de-shuffling circuit 206 in accordance with an embodiment of the present invention, the 8-bit video data from the inner error correction code decoding circuit 205 (FIG. 5) is supplied to a video data input terminal 301 for writing in a first memory, in the form of a field memory 303, in response to an 18-bit write address applied to that memory 303 from an address data input terminal 302. It will be appreciated that the write address supplied through terminal 302 is suitably formed on the basis of the ID signal detected for the respective data in the detection circuit 204. The video data written at the various addresses of the field memory 303 are read out therefrom in response to 18-bit read addresses generated by a read address generator 304 in an order to effect de-shuffling of the data in a manner that is complementary to the intra sector shuffling earlier effected in the circuit 105 of the recording system. The video data read out from the field memory 303 in response to the read addresses are selectively supplied through a selector 305, which is hereinafter further described, to an output terminal 306 from which the output data is transferred to the outer error correction code decoding circuit 207 (FIG. 5).

The intra sector de-shuffling circuit 206 is further shown to comprise a data hold timer circuit 307 which, as hereinafter described in detail, is intended to operate only when the digital VTR is in a shuttle mode, that is, performing a playback or reproducing operation with a variable tape speed. The establishment of the shuttle mode is indicated by a variable speed playback mode indicating signal applied to circuit 307 through a mode signal input terminal 308. The data hold timer circuit 307 is shown to include a second memory constituted by a counter memory 309 which receives as its write and read addresses, the upper twelve bits of the 18-bit write and read addresses, respectively, for the field memory 303.

The circuit 307 further includes a preset value generating circuit 310 under the control of the playback mode indicating signal applied to terminal 308 for providing respective preset data, for example, of 3 bits, to one input of a selector 312 which, at another input paired with that one input, receives an error flag applied to an error flag input terminal 311 from the inner error correction code decoding circuit 205 (FIG. 5). The selector 312 is controlled by a read/write enable signal which is also applied to field memory 303 from a terminal 317 so that selector 312 supplies the preset data from generator 310 and the error flag from terminal 311 to respective inputs of the counter memory 309 when the write enable signal is applied to terminal 317. On the other hand, in response to the application of the read enable signal to the terminal 317, the selector 312 is changed-over to supply to the inputs of counter memory 309 the 3-bit output data from an adder 313 and the error flag output of the counter memory 309, respectively. The adder 313 is effective to increment by one bit the 3-bit timer count data being output from the counter memory 309. Such 3-bit timer count data which is output from the counter memory 309 is also supplied to a decoder 314. When the 3-bits of the timer count data applied to the decoder 314 all become "1", that is, when the 3-bit timer count data indicate "7" in decimal notation, the decoder 314 generates a decoded output or switching signal for changing-over selector 305 so that the latter supplies predetermined fixed data from a fixed video data generating circuit 315 to the video data output terminal 306 in place of the video data read out of the field memory 303. As earlier noted, the error flag output of the counter memory 309 is fed back through the selector 312 to an input of the counter memory 309 in response to the read enable signal, and such error flag output is also supplied through an error flag output terminal 316 to the succeeding outer error correction code decoding circuit 207 on FIG. 5.

The operation of the data hold timer circuit 307 provided, in accordance with this invention, in the intra sector de-shuffling circuit 206 will now be described. In the shuttle mode of the digital VTR, that is, during a playback or reproducing operation with a tape speed different from that used during the recording operation, the magnetic head 201 does not scan along one of the recorded tracks, but rather traces the tape T across a plurality of the recorded tracks shown in FIG. 4 so that the Sync. blocks recorded in a track are not reproduced in succession but rather are skipped with the result that the order of the reproduced Sync. blocks is discontinuous. Accordingly, data of one video field are not written in the field memory 303. Therefore, when the data reproduced during the time of one field period are supplied, in Sync. block units, to the inner error correction code decoding circuit 205, such data are corrected and then written in the field memory 303 in inner code block units during a period in which a write enable signal is applied to the input terminal 317. At such time, the write address applied to the terminal 302 is generated on the basis of the ID signal included in the respective Sync. block.

In response to the upper twelve bits of the 18-bit write address being supplied to the field memory 303, an address of the counter memory 309 is selected which corresponds to 85 addresses in the field memory 303 for receiving the 85 data samples, respectively, of an inner code block. Further, in response to the write enable signal applied to the input terminal 317, selector 312 is conditioned to supply to the counter memory 309, for writing at such selected address, the 3-bit preset data, for example, indicative of "zero", from the preset value generating circuit 310 and the error flag of the respective inner code block unit from the error flag input terminal 311. At such time, the write enable signal is supplied through an input terminal 318 to the counter memory 309.

After the reproduced data of one field period have been written in the field memory 303, such data is read out from the field memory 303 until the reproduced data of the next field period is written therein. The read addresses for reading out the data from the field memory 303 are derived from the read address generating circuit 304 in an order effective to achieve de-interleaving of all of the field data. During such read out of data from the field memory 303, the upper twelve bits of each of the read addresses from generator 304 and the read enable signal from terminal 318 are supplied to the counter memory 309 so that the timer count data and the error flag are read out from that address of the counter memory 309 which corresponds to the addresses of the field memory 303 from which the data are being concurrently read out. Assuming that the timer count data being read out from the counter memory 309 are indicative of "zero", the decoder 314 responds thereto to cause selector 305 to supply the video data read out from the field memory 303 to the output terminal 306 while the error flag associated with such video data is supplied from the respective output of the counter memory 309 to the output terminal 316 for transfer to the outer error correction code decoding circuit 207.

Simultaneously with the read out of video data from the field memory 303 and of the associated error flag from the counter memory 309, the timer count data then being read out from the counter memory 309 are supplied to the adder 313 to be incremented by one bit and then supplied through the selector 312 to be written again at the same address in the memory 309. The error flag read out from the counter memory 309 is fed back through the selector 312 to be rewritten in the counter memory 309 along with the incremented timer count data. Accordingly, each time video data written at a particular address in the field memory 303 is read out therefrom, the corresponding timer count data in the counter memory 309 is incremented bit-by-bit. When the incremented timer count data read out from an address in the counter memory 309 and supplied to the decoder 314 attains a value indicating "7" in decimal notation, the decoder 314 generates a switching signal by which the selector 305 is changed-over for selecting the fixed video data from generator 315 in place of the video data then being read out from the field memory 303. Such fixed video data from generator 315 may be, for example, intermediate value data indicative of a "gray color". In the illustrated embodiment of the invention, when selector 305 is changed-over to select the fixed video data for application to the output terminal 306, such fixed video data or data having a predetermined pattern are supplied to the succeeding outer error correction code decoding circuit 207 (FIG. 5). Alternatively, during a playback operation with a variable tape speed, when the fixed video data is transmitted through selector 305 to output terminal 306, the outer code decoding of such output data may be omitted. In any case, when the same data written once in the field memory 303 is read out therefrom seven times, such data is replaced by the fixed video data.

Furthermore, if the 3-bit preset data from generator 310 is increased, for example, to a value indicating "3", in decimal notation, it is possible to reduce the number of times the same data written once at an address in the field memory 303 needs to be read out of the latter before such data is replaced by the fixed video data from the generator 315. Further, the value indicated by the preset data from the generator 310 may be changed in gang relation with the reproducing mode, that is, in accordance with changes in the reproducing mode, for example, from playback with the normal tape speed to playback with a tape speed either slower or faster than the normal tape speed used for recording. Further, the incrementing operation for the timer count data by means of the adder 313 may be completely effected during the blanking period between successive fields, rather than when the data is being read out from the field memory 303.

In the normal reproducing mode, that is, during a reproducing operation with the tape being driven at the same speed as was employed for the recording of the signal, the above described signal processing is not required because there is very little possibility that data will occur that it not properly reproduced during one field. When a signal indicative of the normal reproducing mode is supplied to the mode signal input terminal 308, the data hold timer circuit 307 is made inoperative, for example, by causing the preset value generating circuit 310 to provide 3-bit preset data representing the value "7" in the decimal notation.

Although the data hold timer circuit 307 in the illustrated embodiment of the invention has a counter configuration, the circuit 307 may take various other forms, such as, a register configuration provided with multiple stages. In the latter case, when the data are written at a particular address in the field memory 303, a corresponding address of the first register stage is reset to "zero" and thereafter, each time the same data is read out from that address in the field memory 303, "1" is written at the corresponding address of the next stage of the register until it is detected that "1" is written at the corresponding address in the final stage of the register. In response to the detection of "1" at the corresponding address in the final register stage, the video data being read out of the field memory 303 is replaced by the fixed data from the generator 315.

By way of summary, it will be appreciated that, in the described embodiment of the invention, when video data are written at a particular address in the first or field memory 303, the fact that the data has been written in the memory 303 that a particular address corresponding to the respective write address is stored in the second or counter memory 309 at an address corresponding to the previously mentioned write address. Then, each time data are read out from a particular address in the first memory 303, that fact is registered at the corresponding address in the second memory 309, whereupon data being read out from a particular address in the first memory 303 is replaced by fixed data from another data source, for example, the generator 315, when it is indicated by the read out from the corresponding address in the second memory 309, that the data being read out from the first memory has been already read out therefrom a predetermined number of times. As a result of the foregoing, during playback with a variable tape speed, that is, in the shuttle mode, it is possible to prevent the inclusion in the output video data of picture elements having no correlation with the other picture elements constituting a field. Further, during reproducing with a variable tape speed, when the displayed picture represents a moving object, the follow-up characteristic of the displayed picture is excellent with the result that the appearance of a residual image is reduced substantially and the displayed moving picture is of excellent quality.

In the embodiment of the invention described above with reference to FIG. 6, when the 3-bit timer count data obtained at the output of counter memory 309 indicates a predetermined value, for example, the value "7" in the decimal notation, the resulting signal from the decoder 314 is applied to and changes-over the selector 305 so that the video data being then derived from the field memory 303 is replaced by the fixed data from the generator 315. However, instead of such arrangement, and as indicated by the broken line on FIG. 6, the signal from the decoder 314 may be merely supplied to the error flag output terminal 316 which is, in turn, connected to the error concealment circuit 209 of FIG. 5. Further, in the embodiment being here described, the error flag output of counter memory 309 is not connected to the output terminal 316, the selector 305 and fixed data generator 315 are omitted, and the output of the field memory 303 is connected directly to the output terminal 306. It will be appreciated that, when the output signal of the decoder 314 is applied to the terminal 316, as aforesaid, such output signal serves as an error flag and, in response thereto, the error concealment circuit 209 functions to conceal or interpolate the respective output data from the field memory 303.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. An apparatus for processing digital data comprising:
    input circuit means for providing an input digital signal including word data and write addresses associated with respective words of said word data;
    memory means connected to said input circuit means for storing said words of said word data from said input circuit means according to said respective write addresses;
    read address generating means for generating read addresses and being connected with said memory means for reading out the stored words from the respective addresses of said memory means;
    output circuit means for deriving an output signal;
    word data generating means for generating word data having a predetermined pattern;
    switching means connected to said memory means, said output circuit means and said word data generating means for selectively providing, as said output signal, the stored words which are read out from said memory means or said word data having said predetermined pattern from said word data generating means; and
    control means supplied with said write and read addresses for controlling said switching means to provide said output circuit means with said word data having said predetermined pattern from said word data generating means as said output signal instead of said stored words read out of said memory means when a stored word being read out has been read out of said memory means a predetermined multiple number of times.

2. An apparatus according to claim 1; wherein said control means includes second memory means for storing flag bits in a first state in accordance with the write addresses at which the respective words of word data are written in the first mentioned memory means, and means for rewriting said flag bits in said second memory means in a second state in response to said read addresses by which the respective words of word data are read from said first memory means.

3. An apparatus according to claim 1; wherein said control means further includes mode signal input terminal means for receiving an abnormal reproducing mode signal, and said control means is operable to control said switching means only when said abnormal reproducing mode signal is supplied to said mode signal input terminal means.

4. An apparatus according to claim 1; wherein said control means includes second memory means having addresses therein addressed in response to said write addresses and read addresses, means for writing in an address of said second memory means corresponding to one of said write addresses a flag associated with the word then being written in the first mentioned memory means at said one write address, means for writing preset data with each said flag, means for incrementing said preset data each time the latter and the respective flag are read out of the respective address of said second memory means in response to the reading out of the respective stored word of word data from said first memory means by the corresponding one of said read addresses, means for rewriting the read out flag and the incremented preset data at said respective address in said second memory means from which the flag has been read out, and means responsive to the value represented by the preset data read out of said second memory means for causing said switching means to select said word data having said predetermined pattern when the read out data has been incremented to represent at least a predetermined value.

5. An apparatus according to claim 4; wherein said means for writing preset data with each flag includes preset data generating means, and means for applying a mode indicating signal to said generating means so that the value of said preset data is determined in response to said mode indicating signal.

6. An apparatus according to claim 5; wherein said means for rewriting includes selector means having a first state in response to the writing of word data in said first memory means and in which said preset data from said generating means and said flag associated with said word data are supplied to said second memory means for writing in the latter, and a second state in response to the read out of word data from said first memory means and in which said read out flag and the incremented preset data are again supplied to said second memory means.

7. An apparatus for processing digital data comprising:
    input circuit means for providing an input digital video signal including word data and write addresses associated with respective words of said word data;
    memory means connected to said input circuit means for storing said words of said word data according to said respective write addresses;
    read address generating means for generating read addresses and being connected with said memory means for reading out the stored words from the respective addresses of said memory means;
    output circuit means for deriving an output signal; and
    control means responsive to said write and read addresses for providing an error flag when the same stored word has been read out of said memory means a predetermined multiple number of times.

8. An apparatus according to claim 7; wherein said control means includes second memory means having addresses therein addressed in response to said write addresses and read addresses, means for writing preset data in an address of said second memory means corresponding to one of said write addresses at which a word is being written in the first mentioned memory means, means for incrementing said preset data each time the latter are read out of the respective address of said second memory means in response to the reading out of the respective stored word of word data from said first memory means by the corresponding one of said read addresses, means for rewriting the incremented preset data at said respective address in said second memory means, and means responsive to the value represented by the preset data read out of said second memory means for generating said error flag when the read out preset data has been incremented to represent at least a predetermined value.

9. An apparatus according to claim 8; wherein said means for writing preset data includes preset data generating means, and means for applying a mode indicating signal to said generating means so that the value of said preset data is determined in response to said mode indicating signal.

10. An apparatus according to claim 9; wherein said means for rewriting includes selector means having a first state in response to the writing of word data in said first memory means and in which said preset data from said generating means are supplied to said second memory means for writing in the latter, and a second state in response to the read out of the word data from said first memory means and in which said incremented preset data are again supplied to said second memory means.

* * * * *